F. D. BARNES.
TRAP NEST.
APPLICATION FILED OCT. 9, 1917.

1,304,845.  Patented May 27, 1919.

Witnesses
G. C. Walling

Inventor
F. D. Barnes
By Chandler & Chandler
Attorney

UNITED STATES PATENT OFFICE.

FRANK D. BARNES, OF CUMMINGS, CALIFORNIA.

TRAP-NEST.

1,304,845.  Specification of Letters Patent.  Patented May 27, 1919.

Application filed October 9, 1917. Serial No. 195,556.

*To all whom it may concern:*

Be it known that I, FRANK D. BARNES, a citizen of the United States, residing at Cummings, in the county of Mendocino, State of California, have invented certain new and useful Improvements in Trap-Nests; and I do hereby declare the following to be a full, clear, and exact description of the invention, such as will enable others skilled in the art to which it appertains to make and use the same.

This invention relates to nests for laying hens.

The object of the invention is to construct a nest for laying hens which may be converted at will into a trap nest, or one in which a hen is enabled to isolate herself while laying but may emerge therefrom at will.

Furthermore, it is the object of this invention to provide a closure or trap device which is applicable, not only to hens' nests, but also in other connections, such as closures for stock pens or yards or as a trap for large or small wild animals and pests.

With the above objects in view, and such others relating to the details of construction as may hereinafter appear, my invention will now be fully set forth and described, reference being had to the accompanying drawings.

In the drawings:—

Figure 1:
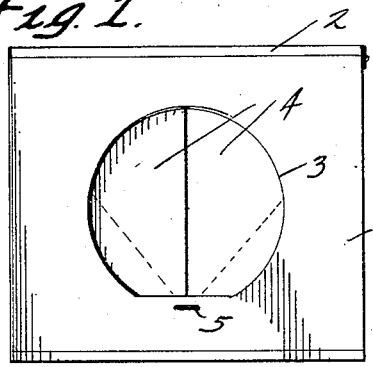
Figure 1 is a front elevation of a nest having my invention applied thereto.
Figure 2:
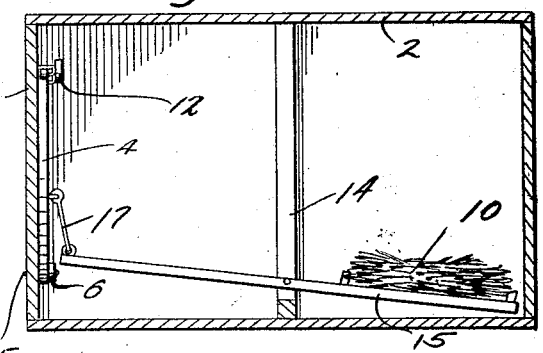
Fig. 2 is a side elevation of the nest having the side wall removed.
Figure 4:
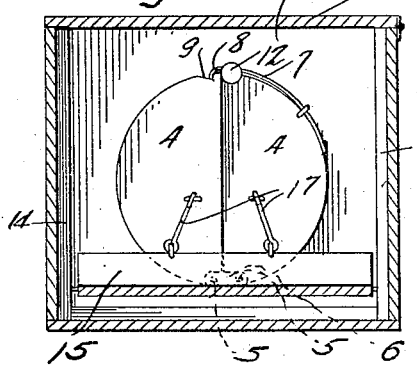
Fig. 4 is a transverse section.
Figure 3:
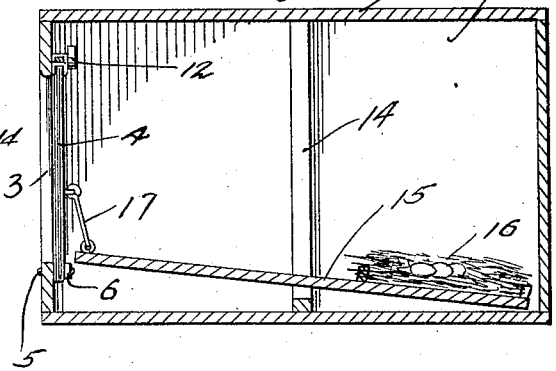
Fig. 3 is a longitudinal section taken therethrough.
Figures 5, 7:
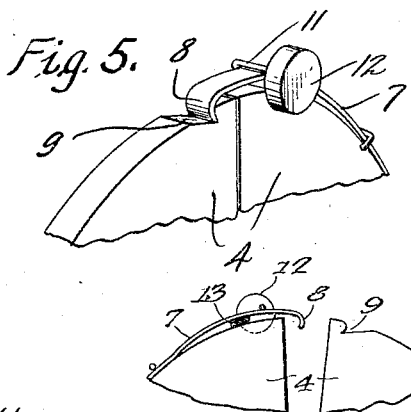
Fig. 5 is an enlarged detail view of the latch device.
Fig. 7 is a transverse sectional view through the latch device in inoperative position.
Figure 6:
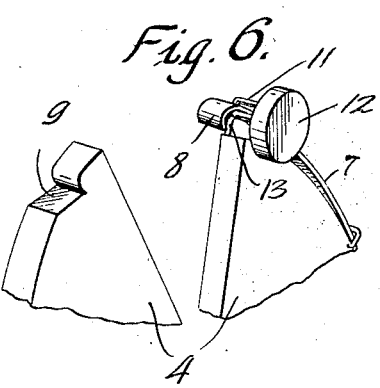
Fig. 6 is a similar view showing the latch in inoperative position.

Referring more particularly to the drawings, 1 represents a nest box of suitable dimension which has a hinged cover 2. One end of the nest is provided with an entrance opening 3, which is preferably circular in form and is properly disposed to give the hen easy access. Mounted upon the inner face of the end wall so as to permit their being swung into position across the opening, is a pair of semi-circular closure elements 4. The closure elements 4 are pivoted to the end wall of the nest below the opening 3, upon independent pivots, so that to close the opening 3 their edges may be swung into contact with one another, and when allowed to fall apart, they will uncover the opening 3 and their straight edges will stand in divergent relation from their pivot points. The closure elements 4 are mounted upon pins 5, and in order to hold the pins in proper parallel relation, I preferably expand their free ends with a cleat 6, the latter also aiding and holding the sections 4 in proper relation to the opening 3.

The upper end of one of the members 4, along the peripheral edge thereof, is provided with a leaf spring 7 whose free end is turned into or provided with a snap hook or lug 8, and whose fixed end is attached to the edge of the element at a considerable distance from the extremity of the latter. The snap hook 8 overhangs the straight edge of the element, and is adapted to engage in a lock notch 9 which is formed in the upper extremity of the second member, so that when the straight edges of the elements are brought together, the lug 8 will engage the notch 9. In order to render the spring inoperative, so that it will not lock the elements 4 in their upraised position, a staple 11 loosely embraces the leaf spring inwardly of and adjacent the inner edge of the closure element 4, and has the ends of its legs remote from its bight portion extended past the inner side of the closure element 4 and secured to a finger button 12. Extending from that leg of the staple which is disposed between the leaf spring and the closure element is a lateral wing 13 engageable with the periphery of the closure element, and adapted to either extend at substantially right angles between the leaf spring and the periphery to hold the leaf spring in raised position whereby its hook portion 8 will not engage in the locking notch 9, or to extend longitudinally between the leaf spring and periphery, pivotal movement of the staple to effect these positions of the wing being permitted by its loose relation with the leaf spring 7 on which it is mounted. Resilient pressure of the leaf spring holds the wing in its right angular raised position. The finger button carried by the staple may be readily engaged by lifting the cover 2, when the closure elements are locked in closed position or by inserting the hand through the opening 3 when the closure elements are open.

The sides of the box 1, are provided at suitably selected intermediate points with the vertical cleats 14 between which, near the lower ends is mounted a tilting platform 15. The platform 15 occupies practically all of the horizontal area of the nest, and to the rear of its fulcrum point carries the nest 16. The forward end of the platform 15 is linked, by means of rods 17 to the members 4 in such a manner that when the forward end of the platform 15 is depressed, the members will be thrown open, while when the hen stands upon the rear end of the platform, or occupies the nest, the forward end of the platform will be elevated so as to throw the members in closed position.

The nest of the foregoing description will operate in like manner with other hens' nests, but it is particularly advantageous in that by a very simple and effective mechanism, the nest is convertible from a simple nest to a trap nest, by means of which the hen may be entrapped when she enters to lay. This conversion, is effected merely by the revolution through a partial turn of the button 10. It will be obvious from the foregoing that on a larger scale, the same mechanism is applicable for use as an entrance to scratching yards, stock pens, setting yards for poultry, stock or horses, or, on a smaller scale as a practical device for trapping rodents and other pests.

What I claim as my invention is:—

1. A device of the class described including a receptacle provided with an entrance opening, a closure member for said opening, an intermediately pivoted platform in the receptacle controlling movement of the closure member, said closure member being provided with a locking recess, a spring supporting member in the receptacle, a leaf spring mounted on said supporting member and having one portion adapted for interlocking engagement in the recess of the closure member, a staple loosely embracing a portion of the leaf spring, a finger member on the staple and a lateral wing on the staple adapted to extend between the spring and supporting member to hold the spring from engagement in the recess of the closure member.

2. A device of the class described comprising a receptacle provided with an entrance opening, a pair of closure members pivoted adjacent the bottom of the entrance opening and movable toward and away from each other to cover and uncover said opening, a platform intermediately pivoted in the receptacle, links pivotally connecting said platform at one side of its pivot with the closure members at points outwardly of the pivots of said closure members, one of said closure members being provided with a locking recess and a leaf spring carried by the other closure member and engageable with the locking recess of the first closure member to hold said closure members together.

In testimony whereof I affix my signature in the presence of two witnesses.

FRANK D. BARNES.

Witnesses:
 CLAIR C. BARNES,
 A. L. SCHELL.

Copies of this patent may be obtained for five cents each, by addressing the "Commissioner of Patents, Washington, D. C."